J. L. THEOBALD.
AUTOMATIC WEIGHING SCALE.
APPLICATION FILED SEPT. 22, 1915.
1,313,614.
Patented Aug. 19, 1919.
4 SHEETS—SHEET 1.
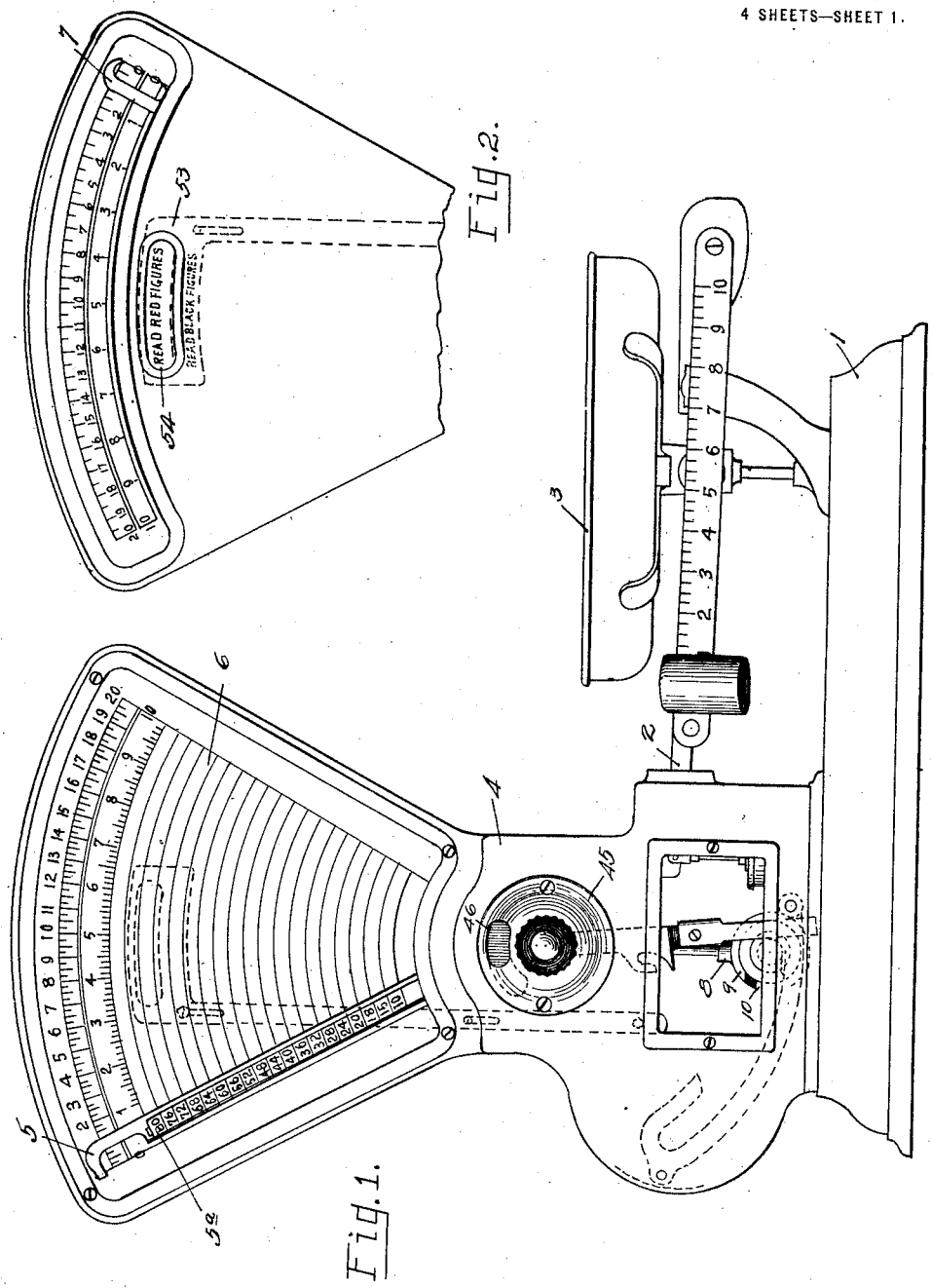

J. L. THEOBALD.
AUTOMATIC WEIGHING SCALE.
APPLICATION FILED SEPT. 22, 1915.
1,313,614.
Patented Aug. 19, 1919.
4 SHEETS—SHEET 2.
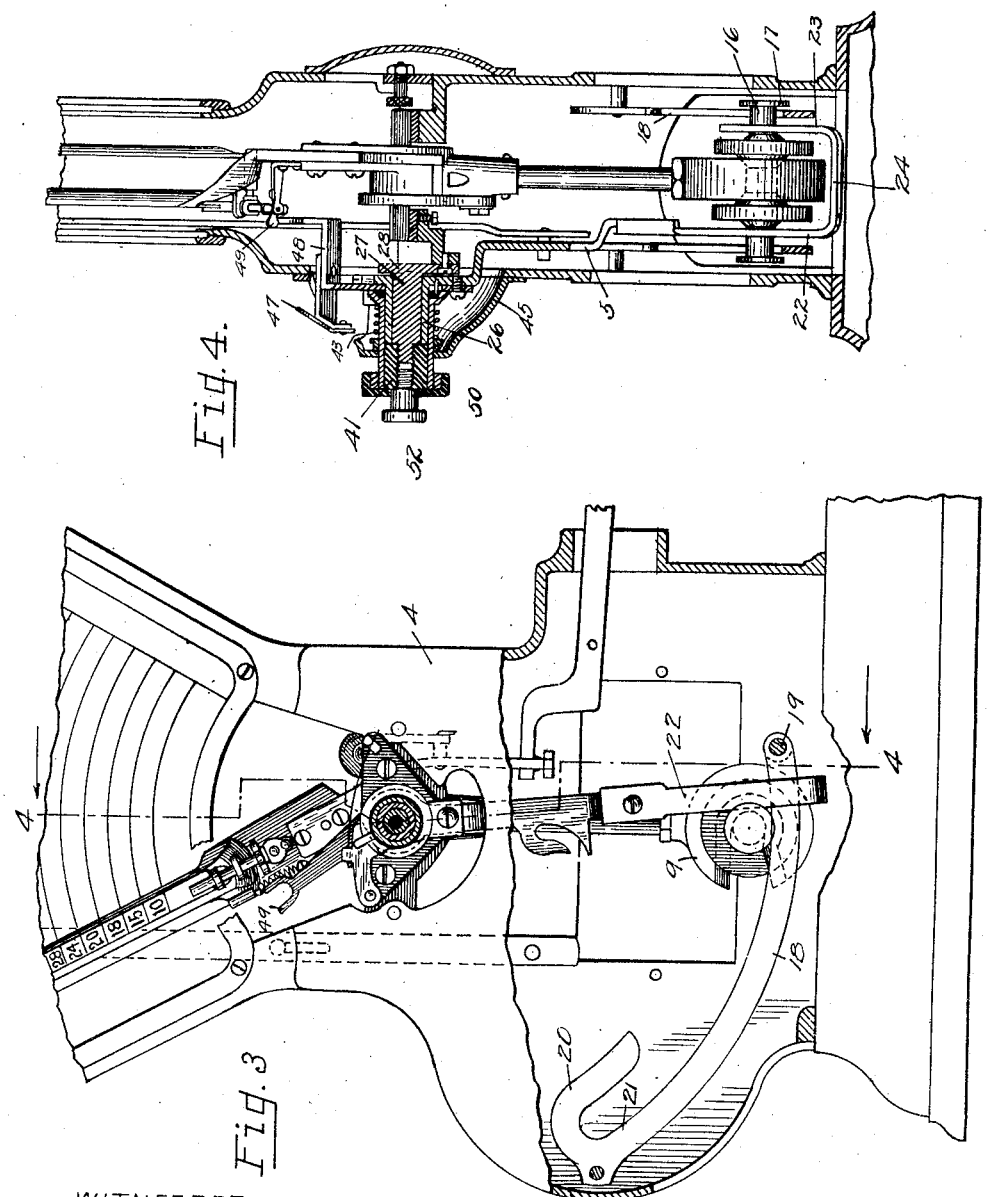
WITNESSES:
D. C. Walter
Carl Finke
INVENTOR.
John L. Theobald
BY George R. Frye
ATTORNEY

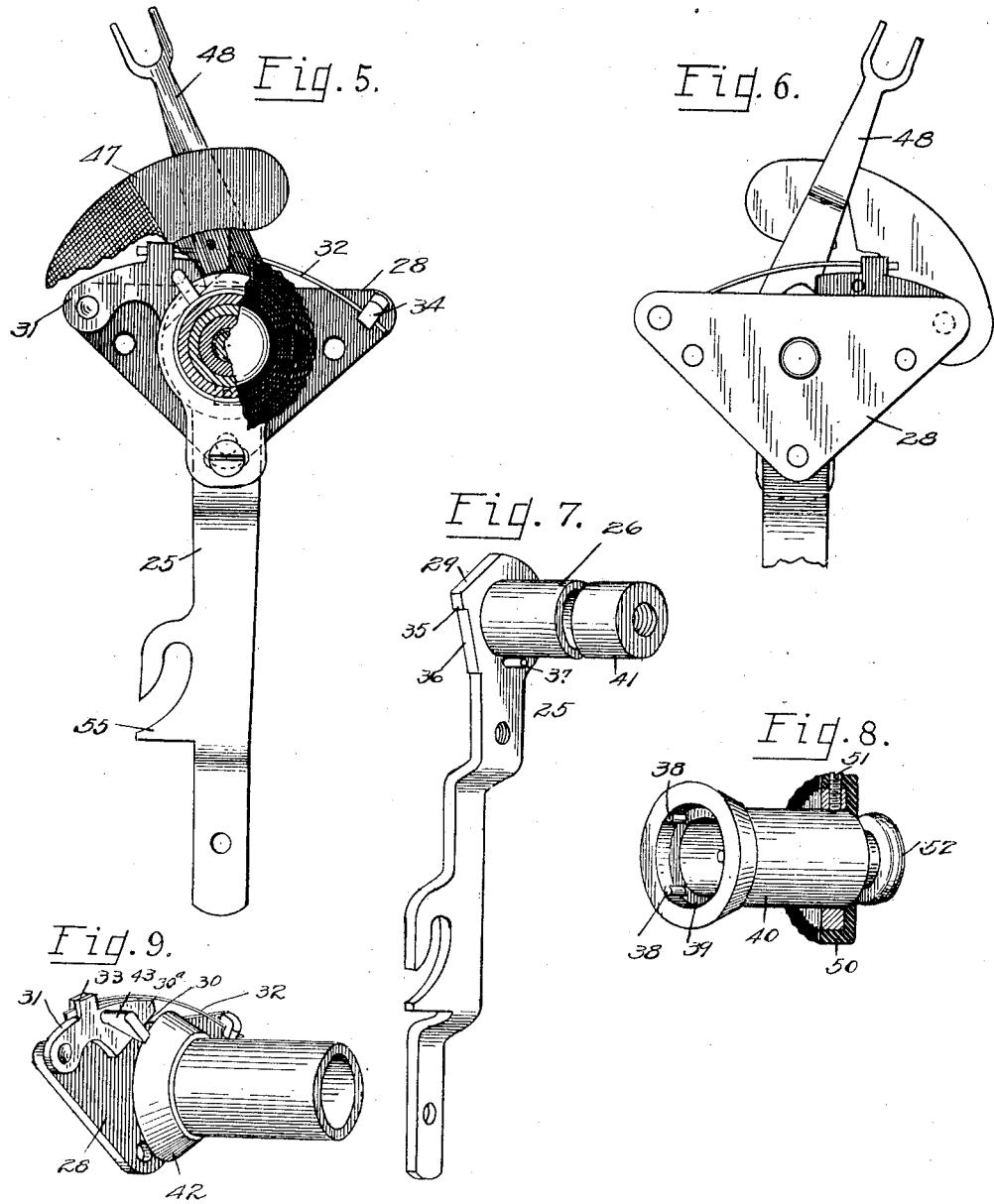

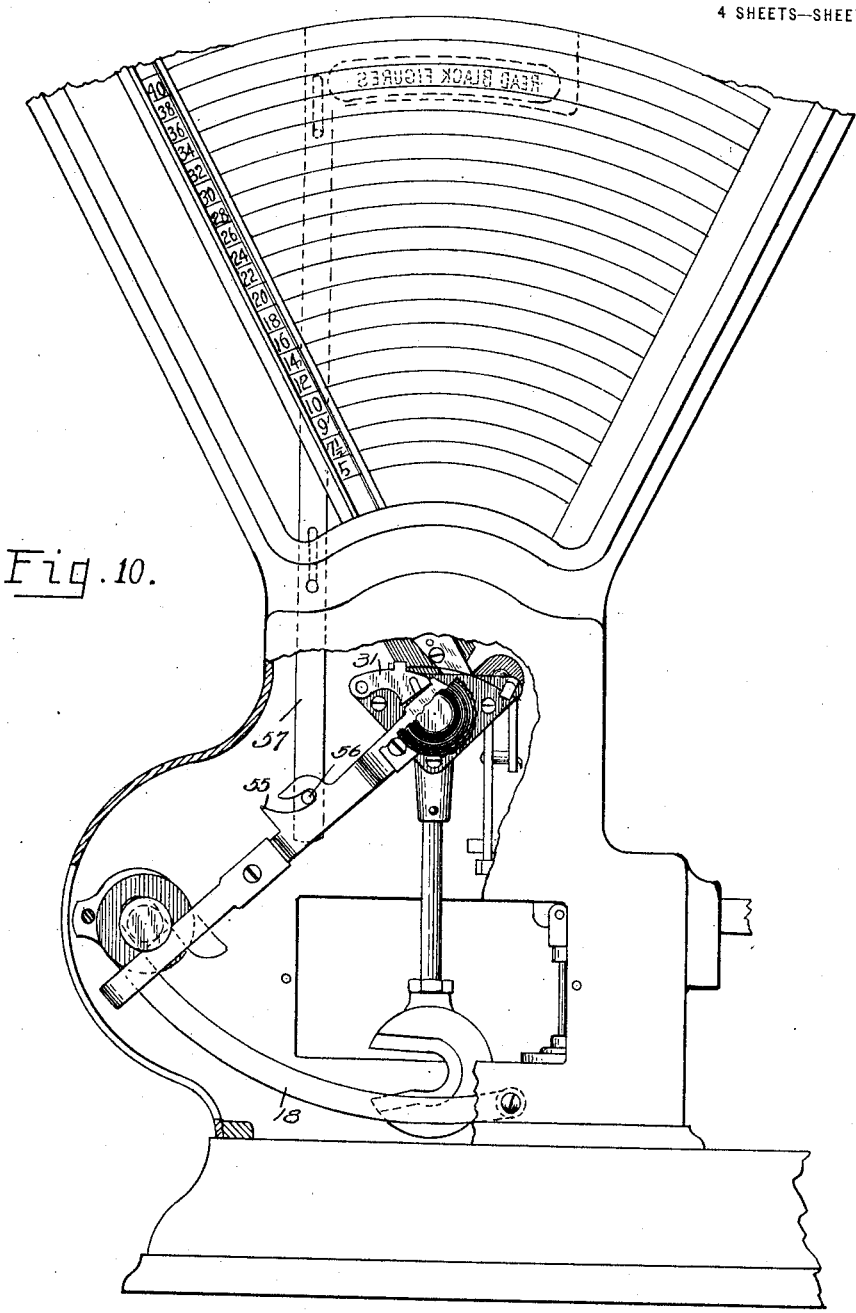

UNITED STATES PATENT OFFICE.

JOHN L. THEOBALD, OF NEW YORK, N. Y., ASSIGNOR TO TOLEDO SCALE COMPANY, OF TOLEDO, OHIO, A CORPORATION OF NEW JERSEY.

AUTOMATIC WEIGHING-SCALE.

1,313,614.               Specification of Letters Patent.      Patented Aug. 19, 1919.

Application filed September 22, 1915. Serial No. 51,912.

*To all whom it may concern:*

Be it known that I, JOHN L. THEOBALD, residing at New York, in the county of New York and State of New York, have invented certain new and useful Improvements in Automatic Weighing-Scales, of which the following is a specification.

The present invention relates to pendulum weighing scales and although not necessarily confined in all its uses to computing scales, nevertheless it is particularly adapted for use in this latter type of apparatus, wherein it is customary to employ an auxiliary weight which when placed upon the pendulum increases the weighing and computing capacity of the scale.

In the particular type of pendulum scales to which the invention is especially adapted, it is customary to employ a table, or chart of computations and weights, together with an index hand carried by the pendulum and arranged to sweep over such chart or table, said hand having inscribed upon it one or more rows of price numerals. The pendulum is appropriately connected with the scale beam carrying a pan or platform on which the commodity to be weighed is placed. The weight of such commodity causes the index hand to move over the chart and properly indicate the weight of the commodity by pointing to one of the weight indications or graduations thereon. The particular numerals on the index hand denoting the price per pound or other unit of measure locate the proper computation, the index hand being usually formed along one edge in such a manner as to assist in locating the computation, as for instance, carrying a reading line or wire extending parallel and adjacent to the row of price numerals. To provide for an increased weight capacity such as effected through the medium of the auxiliary weight on the pendulum, it is customary to inscribe two rows of weight numerals on the chart, one representing double the weighing range of the other, and to inscribe upon the index hand two rows of price numerals, each numeral of one row being double the companion numeral of the other row. Contrasting colors are ordinarily employed so that the user of the scale, as well as the customer, may readily perceive whether the scales are being used under one capacity or the other and that there will be no mistake in the use of the price numerals for determining the proper computations.

The principal object of the present invention is to provide improved means for placing the auxiliary weight upon the pendulum and removing it therefrom, and insuring its being held in proper position when either on or off the pendulum, which means renders it unnecessary for the user of the scale to handle the auxiliary weight, the latter remaining at all times within the casing of the machine in position for immediate use. Thus, the invention provides for the removal of the auxiliary weight from the pendulum by simply turning a knob which protrudes from the casing of the scale, a carrier for the auxiliary weight being then automatically lifted, caught, and held beyond the range of the pendulum's swing. The replacing of the auxiliary weight upon the pendulum involves merely a sliding or forward motion of the knob and its attached sleeve upon a projecting guide member, said carrier and the auxiliary weight carried thereby being released from its raised position and thus caused to fall by gravity and also being urged by mechanical means to travel its full predetermined distance, the said weight being automatically deposited upon the pendulum while the carrier continues to move and takes up a position out of the range of the pendulum's swing. More specifically stated, the object of this invention is to effectually guard against any escape of the auxiliary weight in the process of its removal from, or replacement upon, the pendulum, and insure its traveling the full predetermined range of its movement in either direction and its being held in proper position when either on or off the pendulum, even though the manipulation of parts provided for the proper handling of the auxiliary weight be done carelessly or with intentional violence, or in an attempt to defraud.

With the above and other objects in view, the invention consists in certain novel features of construction and combinations of parts, the essential elements whereof are recited in the sub-joined claims and a preferred embodiment of which is illustrated in the accompanying drawings, wherein similar reference numerals refer to similar parts throughout the several views.

In the drawings:—

Figure 1 is a front elevation of a pendulum weighing scale with the present improvements embodied therein.

Fig. 2 is a rear elevation of the upper portion of the chart housing.

Fig. 3 is an enlarged detail view of portions of the scale, partly in front elevation and partly in longitudinal section, the auxiliary weight being shown in position upon the pendulum.

Fig. 4 is a vertical transverse section taken substantially along the dotted line 4—4 of Fig. 3.

Fig. 5 is an enlarged detail view, partly in front elevation and partly in section of a portion of the mechanism for removing and replacing the auxiliary weight upon the pendulum.

Fig. 6 is a rear elevation of the mechanism shown in Fig. 5.

Figs. 7, 8 and 9 are detail perspective views of parts of the operating mechanism to be hereinafter described, and Fig. 10 is an enlarged detail view of a portion of the scale, partly in front elevation and partly in section, the parts being shown in the position assumed when the auxiliary weight is removed from the pendulum.

It will not be necessary to give a detailed description of the particular type of computing scales here chosen for the purpose of illustrating the preferred embodiment of the invention, because that type of scale is well known through extensive commercial use and a considerable number of prior patents, for example, the DeVilbiss Reissue Patent, No. 12,029, dated Sept. 9, 1902.

Referring to the drawings, the numeral 1 designates a suitable base above which is fulcrumed a scale beam 2 supporting a scale pan or platter 3 and connected within a housing 4 with an index arm 5 which sweeps over a computing chart 6 and has a rear portion 7 looking over two rows of weight numerals on the rear side of the chart plate, as shown in Fig. 2. Corresponding rows of weight numerals appear on the front side of the chart plate just above the table of computations, and it is customary to inscribe them in contrasting colors. The upper row provides for double the weight capacity of the lower row and the index arm 5 ordinarily bears two vertical rows of numerals correspondingly contrasted in color and denoting prices per unit of weight, one row for use when the scale is working in one weight capacity, and the other row being used when the scale is working in the other weight capacity. Preferably the two vertical rows of the index arm are inscribed on opposite sides of a rotatable strap or bar 5ª suitably journaled in bearings carried by the index arm 5, this strap or bar being so located upon the index arm that when turned with either side facing outwardly the numerals thus presented to view will register with the various rows of numerals upon the computing chart or table to co-act therewith in locating the proper computation on the chart. The vertical rows on the strap or bar 5ª are preferably formed in contrasting colors, as for example, one of red and one of black. The index-arm 5 is compounded with a pendulum 8 arranged to swing within the housing 4 and it will be understood that different sets of weight and price numerals are to be read according to the weighing capacity of the pendulum. The latter carries at its lower end a permanent weight 9 of disk-like form made with a radial and slightly flaring opening 10 entering one side and extending around the center of the disk concentrically therewith. The concentric portion of the side of this opening extends through more than a half circle and the lower edge of the opening beyond the concentric portion diverges from the upper edge. Thus a slight depression 11 is formed in the lower side of the radial opening at the inner end thereof, as clearly shown in Fig. 10. The portion of the weight disk 9 immediately surrounding the said radial opening is substantially V-shaped in cross section or edge view, as shown in Fig. 4, although this formation is not continued to a sharp edge, but terminates in a narrow, flat surface 12. The auxiliary weight takes something the shape of a dumb bell, comprising a reduced central portion 13 of the same lateral extent as the said flat surface 12 of the permanent weight and the two side portions 14 in the form of truncated cones, whose angles correspond with those of the V-shaped portions of the permanent weight, as shown in Fig. 4. Beyond those side portions 14 the auxiliary weight is formed with flanges 15 designed to take over the sides of the permanent weight beyond the V-shaped portions thereof, and from the centers of the flanged heads of the auxiliary weight project trunnions 16 with flanged ends 17 for a purpose hereinafter described. Without proceeding further, it will be seen that the above-described formation of the permanent and auxiliary weights is calculated to insure a perfectly accurate and correct engagement between them and one which can not readily be disturbed when once established. The reduced central portion 13 of the auxiliary weight resting in the depression 11 of the permanent weight insures against accidental removal of the auxiliary weight in a radial direction, and the engagement of the conical portions 14 of the auxiliary weight with the V-shaped portions of the permanent weight serves to insure the auxiliary weight properly entering the opening in the permanent weight and taking up the proper position therein. The flanges 15 also serve to prevent any possible axial displacement of the auxiliary weight. As will hereinafter appear this particular construction or formation of the weights is of peculiar advantage in connection with the means herein disclosed for removing and replacing the auxiliary weight at will.

Proceeding now to a description of the means employed for controlling the auxiliary weight, the numeral 18 designates a pair of tracks within the housing 4 and constituting a track upon which the auxiliary weight may travel. These rails are secured at one end in the base of the housing, as indicated at 19, on opposite sides of the pendulum somewhat beyond the limit of the latter's downward swing and they pass the permanent pendulum weight 9 on opposite sides thereof at a level slightly below the depressed portion 10 of the opening in said weight. These rails thence curve upwardly and extend to a point beyond the limits of the upward swing of the pendulum, then curving back over themselves as at 20 to form guideways or runways 21. The trunnions 16 of the auxiliary weight extend over these rails respectively and the flanges 17 take over the outer sides of the rails. It will be seen, therefore, that this auxiliary weight may roll up and down the track formed by said rails without danger of leaving the same and always preserved in proper position to enter and leave the opening in the permanent pendulum weight. The runways 21 provide for the auxiliary weights being maintained in proper position at an elevated part of the track when not engaged on the pendulum weight and when the scales are not out at the lower weight capacity this auxiliary weight is retained at the upper ends of the runways 21, the permanent weight 9 being then free to swing through its arc without being at all influenced by the additional devices employed to change the capacity of the scale.

The auxiliary weight is moved upwardly on its track and held in its inoperative position by means of a hanger arranged to travel between the rails 18 and comprising arms 22, 23 acting against the trunnions 16 and a connecting bar 24, the latter being sufficiently lowered to pass beneath the permanent pendulum weight 9. The arm 22 of this bracket or hanger is secured to a pendent arm 25 which has a hub 26 journaled upon a stub shaft 27 carried by a triangular bracket plate 28 fastened to the front of the housing 4, as clearly shown in Fig. 3. It will be noted that the axis of the stub shaft 27 and of the sleeve 26 is coincident with the axis or fulcrum of the pendulum. The arm 25 and the hanger form a unitary structure arranged to swing upon a center coincident with that of the pendulum and through a range of movement sufficient to carry the auxiliary weight entirely beyond the upward swing of the pendulum weight 9, as shown in Fig. 10, and also to leave the pendulum free as to the extent of its downward swing when carrying the auxiliary weight, as shown in Figs. 1 and 3.

The means for operating the auxiliary weight carrier composed of the arm 25 and the hanger as above mentioned will now be described. The upper part of the arm 25 forming the hub 26 is provided with a flattened portion 29 positioned so that it will be arranged in an inclined position when the auxiliary weight is upon the pendulum, as shown in Figs. 3 and 5. When in this position the inclined portion 29 is contacted by the inclined face 30 of the latch or pawl 31, which is pivoted upon a stud extending from one corner of the triangular bracket plate 28, and pressed downwardly by means of a leaf-spring 32 secured at one end by means of clamping lugs 33 to the pawl 31 and retained at its opposite end by a projecting bracket arm 34 extending from the opposite corner of the bracket plate 28. At one extremity of the flattened portion 29 of the arm 25 the hub 26 is formed with a shoulder or ratchet 35 which is arranged at an angle to the flattened portion 29 for a purpose presently to be described, and from the shoulder 35 extends a second flattened portion 36 adapted to be contacted by the face 30 of the latch 31 when the bracket arm 25 is in the position shown in Fig. 10, i. e., when the auxiliary pendulum weight is held in position off of the pendulum. A lug or pin 37 extends from the forward face of the arm 25 and parallel to the hub 26, as clearly shown in Fig. 7. This lug 37 is adapted to co-act with one of a series of lugs or pins 38 extending rearwardly from a shoulder 39 formed adjacent the rear extremity of an elongated sleeve 40 which is adapted to be loosely mounted for rotative and sliding movements upon the hub 26 of the bracket arm 25 and a guide bushing 41 of the same diameter as the hub 26 and secured in alined position thereto by means of internal threads meshing with a threaded projection upon the forward extremity of the stub shaft 27 upon which the hub 26 is mounted (see Fig. 4). At its rear extremity the sleeve 40 is formed with a flaring shoulder 42 surrounding the pins 38, as shown in Fig. 8, and adapted to extend beneath the inclined lower face of a projecting lug 43 extending forwardly from the latch 31 so that the inclined lower face of said lug is normally pressed against the flaring face of the shoulder 42 by the leaf-spring 32. The forward extremity of the flaring shoulder 42 is preferably cut away to form a radial contact wall for one extremity of a coil spring 43' arranged between this radial portion of the shoulder 42 and a washer 44 which is held in position upon the sleeve 40 by means of a scroll 45 which is secured upon the forward face of the housing 4 of the scale and arranged so as to inclose the mechanism whereby the auxiliary weight carrier is operated. As shown in Fig. 1, this scroll 45 is formed with an aperture 46 through which may be displayed flash plates 47 of contrasting colors, which are moved simultaneously with the carrier arm so as to indicate which of the contrasting colors upon the computing chart 6 should be then utilized in the operation of the scale. This flash plate 47 is secured upon an upwardly extending arm 48 which is secured at its lower extremity to the arm 25, and is formed at its upper extremity with bifurcations or forks 49 adapted to contact the extending teeth of the star wheel 49′ at the lower extremity of the rotatable strip or bar 5ª upon the indicator hand (see Figs. 3 and 4). At its forward extremity the sleeve 40 carries a knurled knob 50 which is exposed outside of the scroll 45 so as to be grasped by the operator when it is desired to move the auxiliary weight to or from the pendulum. The knob 50 is preferably retained in position upon the sleeve 40 by means of a retaining screw 51. A limiting bolt 52 is threaded into the forward extremity of the bushing 41 and is provided with a flanged head adapted to be engaged by the knob 50 at the end of its sliding movement, as will presently be described.

Operation: With the scale operating at its higher weight capacity the parts will be relatively positioned as shown in Figs. 1 and 3, the auxiliary weight being, of course, upon the pendulum to augment its counterbalancing effect in the weighing of goods. The bracket or hanger has left contact with the auxiliary weight and maintains a position beyond the same so as to leave the pendulum entirely free from any counteracting influence. At this time the indicator plate 53 (see Fig. 2) displays the inscription "Read red figures" through an opening 54 in the rear of the housing 4 and the side of the rotatable strip or bar 5ª exhibiting red figures is displayed while the red portion of the bi-colored flash plate 47 is shown through the opening 46 in the front of the housing. To adjust the scales for the lower weight capacity, it is only necessary to turn the knob 50 to the right. The first effect will be to move one of the lugs 38 upon the sleeve 40 into contact with the lug 37 projecting from the arm 25 of the hanger, and then further rotation will rotate the sleeve and hanger together to advance the hanger into contact with the trunnions 16 of the auxiliary weight, the auxiliary weight being then lifted out of the radial opening in the permanent pendulum and rolled up the inclined track provided by the rails 18 until the auxiliary weight passes beyond the limits of the pendulum swing. During the swinging of the hanger to this extreme raised position as above described the hub 26 is rotated so that the latch 31 is moved out of engagement with the flattened portion 29, the shoulder 35 being advanced across the inclined face 30 of the latch 31 until at the extreme limit of the swinging movement of the arm 25 the shoulder 35 has been moved beyond the nose 30ª of the latch 31, the leaf-spring 32 then depressing the latch into contact with the flattened portion 36 so that the nose 30ª of the latch contacts with the shoulder 35 so as to prevent the return of the hanger and auxiliary weight until the latch 31 has been lifted out of engagement with the flattened portion 36. As the arm 25 moves upwardly in its weight-removing operation the projection 55 (see Figs. 5 and 10) engages the pin 56 carried adjacent the lower end of the indicator staff 57 and raises the indicator staff and the indicator plate 53 carried thereby so as to change the indication showing through the opening 54 in the rear of the housing (see Fig. 2), this new inscription preferably being "Read black figures." Also the forked arm 48 is simultaneously operated to engage the star wheel 49′ to turn the rotatable strip or bar 5ª upon the index arm 5 so that the row of numerals inscribed in black can be displayed, and the black portion of the bi-colored flash plate 47 is moved into position to show through the opening 46 in the scroll 45.

To replace the auxiliary weight on the pendulum it is necessary to slide the sleeve 40 longitudinally over the hub 26 and the bushing 41, thereby advancing the flaring shoulder 42 of the sleeve upon the inclined lower face of the projection 43 upon the latch 31 (see Fig. 9) so as to lift the latch 31 out of engagement with the shoulder 35 upon the hanger arm 25, thereby releasing the hanger arm from its raised position and enabling it to fall by gravity into its lowered position beyond the normal position of the pendulum, as shown in Figs. 1 and 3. During the falling movement of the hanger 22 the auxiliary weight rolls down the inclined track 18 into the radial opening in the permanent pendulum weight in which it lodges in proper position to form part of the counterpoise of the scale, the hanger moving to a position beyond the pendulum so as to leave the pendulum entirely free to swing in its load-counterbalancing movements. During the falling movement of the hanger and auxiliary weight the indicator staff 57 is darwn downwardly to change the inscription displayed at the back of the scale, and simultaneously the rotatable strip or bar 5ª is turned and the bi-colored flash plate 47 is rotated to display the required colors to indicate that the higher weight capacity of the scale is to be used.

It will be noted that the means above described for controlling the auxiliary weight does not depend at all upon any particular position which the pendulum may occupy, and hence it is not necessary to provide any means for positioning the pendulum in removing the auxiliary weight therefrom or in replacing said weight thereon.

Also the latch 31 is so arranged relatively to the hanger arm 25 that whenever attempt is made to move the hanger arm and the auxiliary weight this movement must be completed, i. e., the latch will not retain the auxiliary weight off of the pendulum unless the hanger arm has been swung into its extreme upward position, and, as soon as the latch 31 is lifted by the sliding movement of the sleeve 40 to release the hanger arm 25, the weight of the hanger arm and the auxiliary weight will carry the rotatable parts into their extreme downward positions, since it is impossible to restrain this downward movement by grasping any of the exposed elements of the operating mechanism. It will be seen, therefore, that the mechanism herein disclosed will force the hanger arm and auxiliary weight to at all times remain at one or the other extreme of its path of movement.

While it will be apparent that the illustrated embodiment of my invention is well calculated to adequately fulfil the several objects of my invention, it will be understood that the construction is susceptible to modification, variation and change without departing from the spirit and scope of the invention as set forth in the subjoined claims.

Having described my invention, I claim:

1. The combination with pendulum scales, of an auxiliary weight for the pendulum, mechanical operating means for displacing and replacing the weight, comprising manually-operated means for raising the weight to an elevated position, holding means for retaining the weight in such raised position, and means slidable longitudinally of the pivot of the pendulum for detaching the holding means to permit the falling of the weight.

2. The combination with pendulum scales, of an auxiliary weight for the pendulum, mechanical operating means for displacing and replacing the weight, said means comprising a hanger arm arranged to be swung to engage the weight to remove it from the pendulum and to raise it to an elevated position, means engaging the hanger arm for retaining the weight in such elevated position, and means slidable longitudinally of the pivot of the pendulum for moving the holding means out of engagement with the hanger arm to permit the falling of the weight.

3. The combination with pendulum scales, of an auxiliary weight for the pendulum, mechanical operating means for displacing and replacing the weight, said means comprising a hanger arm arranged to be swung to engage the weight to remove it from the pendulum and to support the weight when removed from the pendulum, manually-operated means for swinging said arm and weight to an elevated position, holding means for engaging said arm for retaining it in its elevated position, and means slidable longitudinally of the pivot of the pendulum for removing the holding means from engagement with said arm to allow the falling of the arm and weight.

4. The combination with pendulum scales, of an auxiliary weight for the pendulum, a track upon which said weight may travel into and out of engagement with the pendulum, a swinging arm for propelling the weight along said track and supporting it when out of engagement with the pendulum, manually-operated means for raising said arm with the weight to an elevated position, holding means engaging the arm in its elevated position, and means slidable longitudinally of the pivot of the pendulum for disengaging the holding means whereby the arm and weight may fall from such elevated position.

5. The combination with pendulum scales, of an auxiliary weight for the pendulum, a track upon which said weight may travel into and out of engagement with the pendulum, a swinging arm for propelling the weight along said track and supporting it when out of engagment with the pendulum, manually-operated means for swinging said arm upwardly to carry the weight to an elevated position beyond the range of the pendulum, means for holding the arm in such elevated position, and means slidable longitudinally of the pivot of the pendulum for detaching the holding means to allow the arm and weight to fall by gravity from their raised positions.

6. The combination with pendulum scales, of an auxiliary weight for the pendulum, a track upon which said weight may travel into and out of engagement with the pendulum, a swinging arm for propelling the weight along said track and supporting it when out of engagement with the pendulum, a ratchet on said arm, manually-operated means for swinging said arm upwardly to carry the weight to an elevated position beyond the range of the pendulum, a pawl arranged to engage the ratchet when the arm is in such elevated position to hold the arm and weight, and means slidable longitudinally of the pivot of the pendulum for lifting the pawl out of engagement with said ratchet to allow the arm and weight to fall by gravity from their raised positions.

7. The combination with pendulum scales, of an auxiliary weight for the pendulum, a track upon which said weight may travel into and out of engagement with the pendulum, a swinging arm for propelling the weight along said track and supporting it when out of engagement with the pendulum, a ratchet on said arm, manually-operated means for swinging said arm upwardly to carry the weight to an elevated position beyond the range of the pendulum, a pawl arranged to engage the ratchet when the arm is in such elevated position to hold the arm and weight, and means slidable longitudinally of the pivot of the pendulum, including a flaring shoulder, whereby the pawl may be lifted out of engagement with said ratchet to allow the arm and weight to fall by gravity from their raised positions.

8. The combination with pendulum scales, of an auxiliary weight for the pendulum, a track upon which said weight may travel into and out of engagement with the pendulum, a swinging arm for propelling the weight along said track and supporting it when out of engagement with the pendulum, a ratchet on said arm, manually-operated means for swinging said arm upwardly to carry the weight to an elevated position beyond the range of the pendulum, a pawl arranged to engage the ratchet when the arm is in such elevated position to hold the arm and weight, and means for lifting the pawl out of engagement with said ratchet to allow the arm and weight to fall by gravity from their raised positions, said means comprising co-acting flaring surfaces upon said ratchet and lifting means respectively.

9. The combination with pendulum scales, of an auxiliary weight for the pendulum, a track upon which said weight may travel into and out of engagement with the pendulum, a swinging arm for propelling the weight along said track and supporting it when out of engagement with the pendulum, a ratchet on said arm, manually-operated means for swinging said arm upwardly to carry the weight to an elevated position beyond the range of the pendulum, a pawl arranged to engage the ratchet when the arm is in such elevated position to hold the arm and weight, and longitudinally slidable means for lifting the pawl out of engagement with said ratchet to allow the arm and weight to fall by gravity from their raised positions, said means comprising co-acting flaring surfaces upon said ratchet and lifting means respectively.

JOHN L. THEOBALD.

Witnesses:
WILLIAM J. MAHUKEN,
ISIDOR J. POCHER.

Copies of this patent may be obtained for five cents each, by addressing the "Commissioner of Patents, Washington, D. C."